Oct. 20, 1959  H. H. KEEN  2,909,128
RECORD CONTROLLED CONVEYOR SYSTEMS
Filed June 22, 1951  6 Sheets-Sheet 1

Inventor
HAROLD HALL KEEN
By *Frederick E. Hans*
Attorney

Inventor
HAROLD HALL KEEN
By [signature]
Attorney

Oct. 20, 1959

H. H. KEEN 2,909,128

RECORD CONTROLLED CONVEYOR SYSTEMS

Filed June 22, 1951

Inventor
HAROLD HALL KEEN

By *[signature]*

Attorney

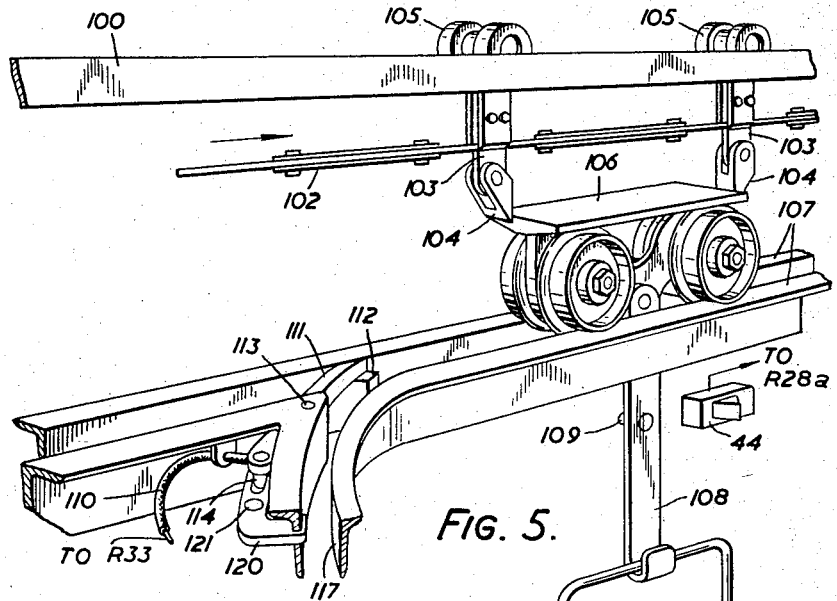
FIG. 5.
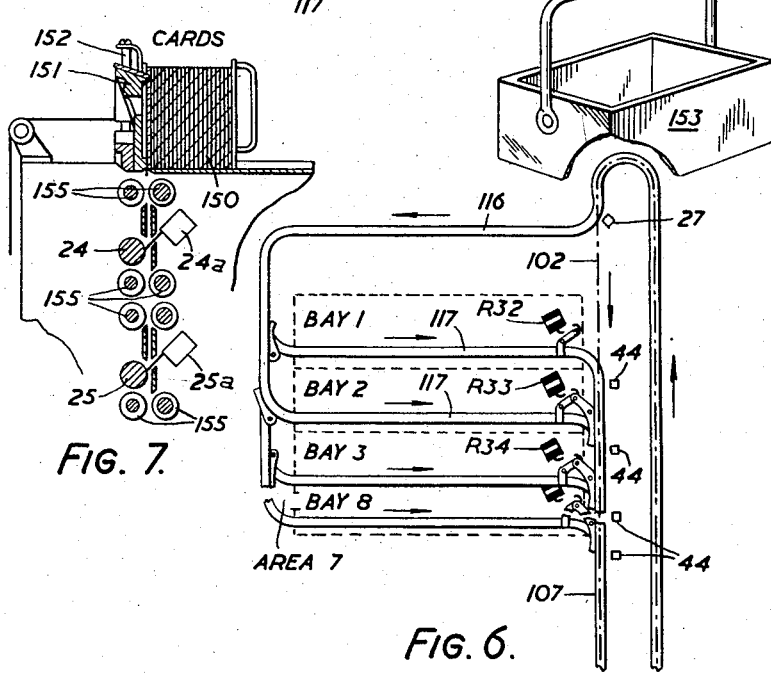
FIG. 7.
FIG. 6.
INVENTOR
HAROLD HALL KEEN
BY
ATTORNEY United States Patent Office 2,909,128
Patented Oct. 20, 1959

2,909,128

RECORD CONTROLLED CONVEYOR SYSTEMS

Harold Hall Keen, Letchworth, England, assignor to International Computers and Tabulators Limited, London, England Application June 22, 1951, Serial No. 232,989

Claims priority, application Great Britain June 22, 1950

13 Claims. (Cl. 104—88)

This invention relates to the automatic control of systems in which a plurality of items are delivered to a single conveyor.

It is common practice in the construction of a complex article to employ sub-assemblies which may be produced at widely separated points in a factory and which are transported by conveyors to a single assembly point at which they are assembled to form the completed article. For example, in the manufacture of cars it may be convenient for the sub-assemblies to comprise a chassis, an engine, a body and two axles.

There may be varieties of one or more sub-assemblies so that the sub-assemblies may be combined in several ways to provide different varieties of the final article. The axles and chassis for a car may be uniform throughout a range of vehicles, but they may be combined with a variety of engines and bodies to form the various types of vehicle within the range.

In order to avoid an excess or a deficit of a particular item occurring at the assembly point, it is desirable that the numbers of sub-assemblies fed on to the conveyor system should be determined by the number of sub-assemblies required to produce a single article and the total number and type of articles to be assembled.

Finally, it may be necessary to despatch from a separate store all the minor items, such as nuts and bolts, dashboard fittings etc., required for the assembling of a complete car and to arrange that they arrive at the assembly point at the same time as the related sub-assemblies. The items required will also vary with the type of car to be assembled, so that it is desirable to provide an indication at the store for each complete set of parts put on the conveyors.

It is necessary to choose a master sub-assembly, such as the body, which will determine the minor items required and due to the layout of the conveyor system this master sub-assembly may take less time to reach the assembly point than the minor items. It is then necessary that a pre-indication be given at the stores, that is to say, the indication is given before the corresponding master sub-assembly has been put on its conveyor.

Accordingly, it is an object of the present invention to provide means for automatically controlling the selection and delivery of a plurality of individual items to a single conveyor so that they are arranged on the conveyor in a predetermined order.

It is a further object to provide, in an automatically controlled conveyor system, means for giving a pre-indication of the type of item to be fed subsequently to a conveyor before selection and feeding of said unit has taken place.

In accordance with the invention in an item conveying system in which a plurality of delivery means feed items to a common conveyor, means for intermittently feeding record cards bearing control data, record card sensing means, means controlled by the common conveyor for rendering said card feed operative and means controlled by data sensed from the record cards for selectively operating said plurality of delivery means.

The invention will now be described by way of example with reference to the accompanying drawings, in which:

Figure 1 is a schematic diagram of the layout of an automatically controlled multiple conveyor system.

Figures 2A and 2B taken together show the circuits employed for controlling the item delivery apparatus.

Fig. 5 is a diagrammatic view of a known chain conveyor trolley and track.

Fig. 6 is a diagram showing the conveyor layout in storage area 7 of Fig. 1, and Fig. 7 is a diagrammatic view of a known card feed with sensing stations.

Figure 1:
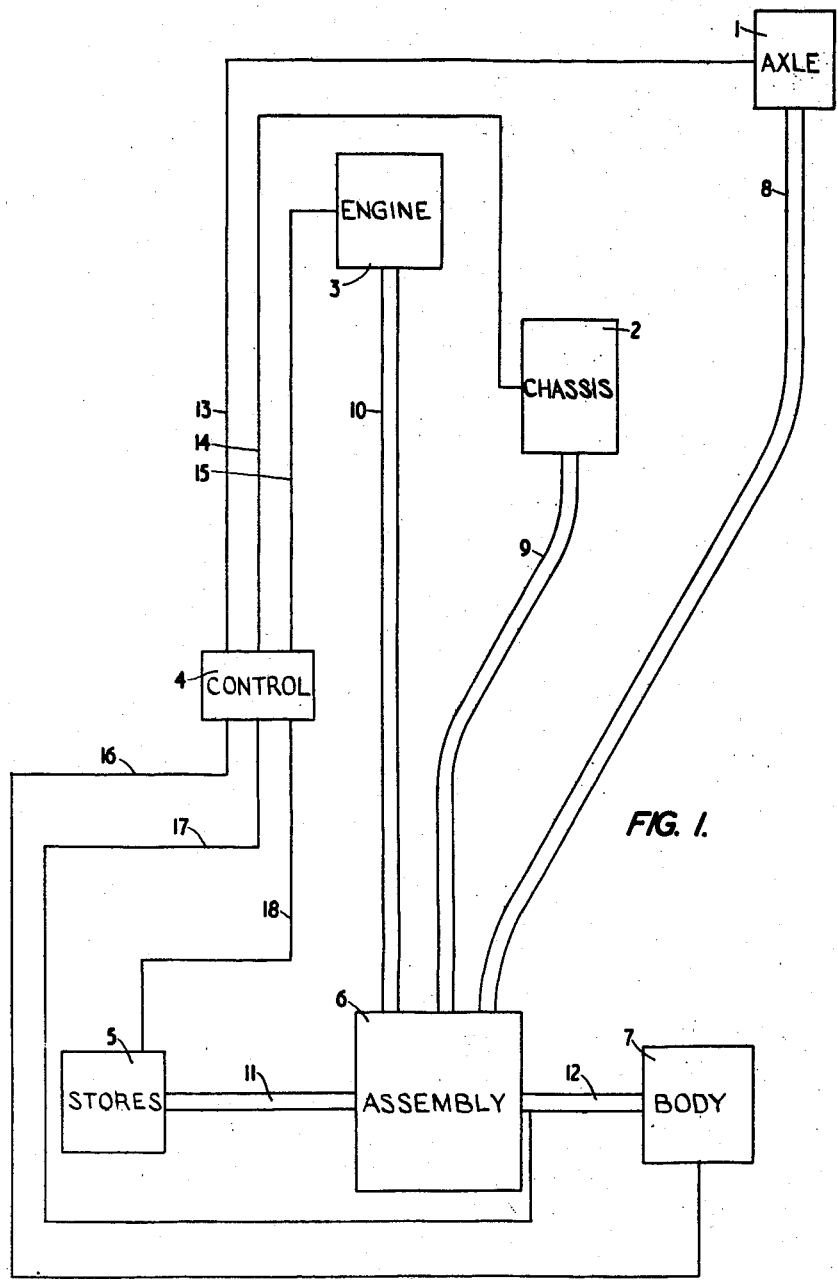

The invention is particularly applicable to the type of conveyor in which a track supports trolleys which are driven along the track by dogs moved by a flexible chain arranged above the trolleys.

The chain is provided with lugs which may engage with the dogs to effect driving of the trolleys. A conveyor of this type is shown and described in British Patents 428,860 and 587,017 and 455,143.

Although this type of construction is particularly suitable, other types of continuous conveyors such as those of the belt type may be employed.

A diagrammatic view of a trolley and part of the track of a chain conveyor is shown in Fig. 5. This is of the kind shown in British Patent 455,143. A trolley 106 runs along a track formed by rails 107, and carries a downwardly projecting extension 108 adapted to support a load, represented by a carrier 153. Trolleys are driven along a main section of the track, represented in the figure by the straight section, by means of a driving chain 102. The chain is driven by any suitable means, and is supported at intervals by rollers 105 running on rails 100 vertically above the main track sections. The rollers 105 are arranged in pairs and each roller is associated with a member 103 which is secured to the chain and carries a dog 104. The pairs of dogs are adapted to pivot inwardly to enable a trolley to be picked up and driven in the following way. A trolley may enter the main track from a branch track, such as 117, and waits for the approach of the next pair of dogs 104 which are driven from left to right as shown in the drawing. The leading dog pivots as it strikes the trolley and passes over it. The trailing or driving dog however, engages the end of the trolley and drives it along the main track. At this time, however, the leading dog has passed completely over the trolley and has restored to its original position thereby providing means for preventing the trolley from running on by its own momentum or under the influence of gravity. Entry of a trolley from the branch track is under control of a releasing mechanism consisting of a diverter arm 111 and a trolley latch 120. The diverter arm is pivoted at 113 and may be swung either across the branch track to make the main track continuous or across the main track as shown in the drawing, thereby providing a guide path for trolleys leaving the branch 117 to enter the main track. The movement of the diverter is controlled by a flexible Bowden cable 110 which, in turn, is controlled electrically by means of a solenoid, such as magnet R33 (Figs. 2B and 6) whose operation will be described. A pin 114 depending from the diverter engages the forked end of a trolley latch 120, which is pivoted at 121. Thus, when the diverter is swung across the branch track the trolley latch is also interposed across the branch and is then in a position to engage the extension 108 of a trolley traveling along the branch toward the main track. Conversely when the release mechanism is operated to withdraw the latch 120 and allow a trolley to proceed to the main track, the diverter is also swung into the position shown, where it rests upon a support lug 112 and provides the necessary guide path for the trolley. The release allows a single trolley to feed out under gravity.

Means is also provided to indicate the passage of a trolley past a point in the main track. The extension 108 on a trolley carries a pin 109, and a microswitch 44 is mounted beside the track in a position where it is engaged by the pin 109. Engagement of the pin with the switch causes the switch contacts to be closed momentarily as the trolley passes.

The layout of a car assembly conveyor system which will be considered by way of example is shown diagrammatically, Figure 1. Axles are transported from a storage area 1, to an assembly point 6 by a conveyor 8. Chassis and engines are taken by conveyors 9 and 10 to the assembly point 6 from storage areas 2 and 3. Car bodies are transported from a storage area 7 by a conveyor 12. The minor items are held in a store 5 which is connected to the assembly point 6 by a conveyor 11.

The various storage areas are at different distances from the assembly point 6, and since all the conveyors run at the same speed the time taken to convey the sub-assemblies from the storage area to the assembly point will vary and may be, for example:

|  | Minutes |
|---|---|
| Axle | 27 |
| Engine | 21 |
| Chassis | 18 |
| Store | 6 |
| Body | 3 |

In this case, it is necessary for the axles for a particular car to be placed on conveyor 8 first. After an interval of six minutes, the corresponding engine will be put on conveyor 10. After further intervals of three and fifteen minutes respectively, the corresponding chassis and body will be put on their conveyors. This timing will ensure that all the sub-assemblies arrive at the assembly point 6 simultaneously.

Punched record cards of known form are used to control the delivery of the various sub-assemblies to the conveyors. The planned production for each day is listed in terms of the sub-assemblies required. For each car a record card is punched, bearing the details of the sub-assemblies by type number. For example, the first car might require a chassis, two axles, a type No. 3 engine and a type No. 2 body, and the next vehicle might require a chassis, two axles, a type No. 1 engine and a type No. 1 body. These requirements would be described by five fields of a card the first of which would record the type number of the car and four further fields would record details of chassis, axle, engine and body.

The first card has, for example, 40 punched in the first field as the type number of the car. The remaining fields are punched with the digits 1, 1, 3 and 2. Since there is only one type of chassis and axle, the digit 1 will appear in the corersponding fields on all cards. For the second car, both the engine and the body are type No. 1, so that the corresponding card will be punched with, say, 40 in the car type number field, and the digit 1 in the four other fields.

In the present example, four duplicate packs are required, making a total of five packs of cards.

Similar cards are produced for each of the other cars included in the production for one day, so that a complete pack of cards represents the production for that day. Alternatively, a master file of pre-punched cards may be maintained and the required cards selected from the file.

The complete pack of cards is now run through a tabulating machine, of known form, to obtain a list of all the cards contained in the pack. This list is checked against the planned production to ensure that the cards are correct.

The checked pack of cards is then run through a record card reproducing machine of known form to produce a number of duplicate packs. The conveyor control equipment is mainly located at a control station 4 (Figure 1) which may be at any convenient point since it is linked to the sub-assembly areas only by electric cables. There are five units at the control station, each such unit comprising a card feeding mechanism, a card sensing mechanism having two sensing stations, and means for registering digital values recorded on the card. All these items are included in well known forms of record card tabulating machines, such as that shown and described in U.S. patent specification 2,174,699, to which reference may be had for a further description of parts not described in detail herein. It is convenient, therefore, to use five such tabulating machines at the control station.

It is convenient to consider first the more complex form of control in which, for example, one out of eight body types is to be selected for delivery to the conveyor. Additionally, it will be assumed that the bodies at storage area 7 (Figure 1) are held in eight bays arranged side by side from each of which a body carried by a trolley may be delivered to a position in which the trolley is picked up by the conveyor, i.e. the delivery points are spaced along a length of the conveyor, and each bay contains one type of body only.

To allow of the maximum economy of space, the bays may be spaced more closely than the distance between adjacent pairs of dogs on the conveyor, so that the distance between six pairs of dogs is the same as that occupied by the eight bays. This necessitates special provision for controlling the release of body-carrying trolleys to the point at which they are picked up by the conveyor, to ensure that each trolley is picked up by the driving dog of the correct pair.

Figure 2A:
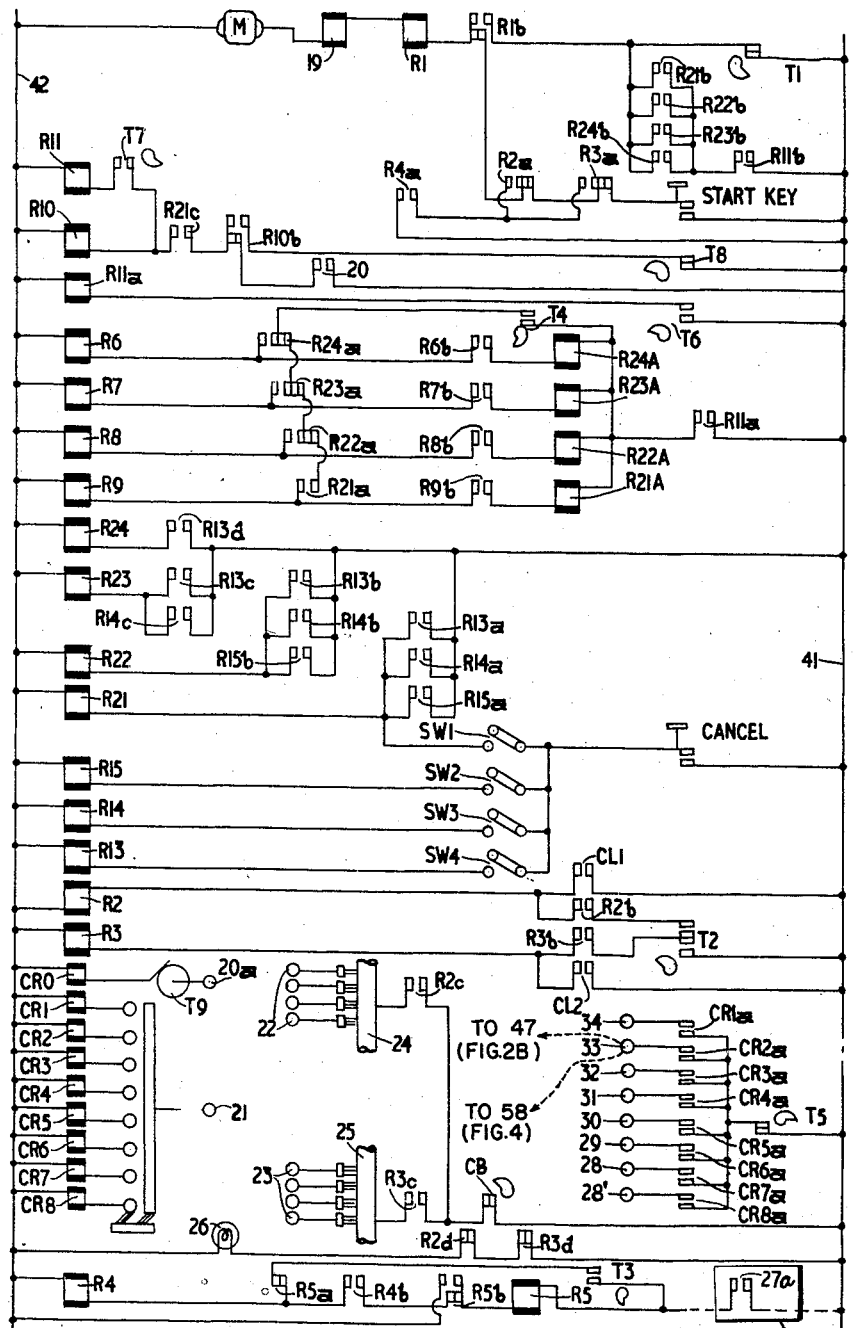

Trolleys are released from the bays under control of that one of the tabulating machines at the control station associated with the body sub-assembly storage area. As shown in Fig. 7 a tabulating machine has a card feed magazine into which one of the duplicate packs of cards 150 is placed. A card is fed from one end of the pack by means of a picker knife mechanism 151 which slides along guides 152 under control of a feed clutch magnet shown diagrammatically at 19 in Fig. 2A. The end card is thus fed downwards by means of pairs of feeding rollers 155 also operated under the control of the feed clutch magnet and passed through a first sensing station having a contact roll 24 (Figs. 2A and 7) and a holder 24a carrying sensing brushes each connected to individual plug points 22. Continued downward movement of the card causes it to pass through a second sensing station having a contact roll 25 and a holder 25a carrying a further set of sensing brushes which, as shown in Fig. 2A are each connected to individual plug points 23. These card feeding operations are initiated by depression of a Start key (Fig. 2A). With the Start key contacts closed, a circuit is made from one supply line 41, Start key contacts (shifted), contacts R3a, contacts R2a, contacts R1b, start control relay R1, a card feed clutch magnet 19, a tabulator drive motor M to the other supply line 42. In consequence, both the feed clutch magnet 19 and the motor M will become operative to feed a card from the stack to the first sensing station. Make before break contacts R1b will shift to establish a hold circuit through tabulator cam contacts T1 (Figures 2A and 3).

Figure 3:
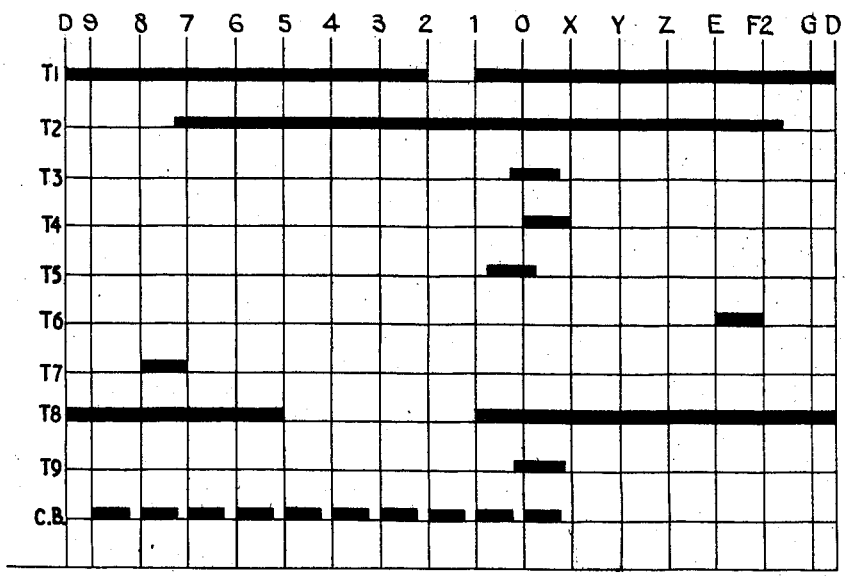
Figure 3 is a cam timing diagram.

The card fed to the first sensing station will close the usual card lever contacts CL1 to make an energizing circuit for a running control relay R2, which will establish a parallel hold circuit through contacts R2b (shifted) and cam contacts T2 when these contacts close just before "7" time in the cycle (Figure 3).

The timing of the various tabulator cam contacts employed in the circuits to be described is shown in Figure 3, the tabulator cycle being divided up into sixteen index points, of which index points 9 to 0 and X and Y correspond to the time of sensing index points on a card.

Contacts R2a (Figure 2A) shift to break the original energizing circuit for relay R1, feed clutch 19 and the motor, so that these will be de-energized when T1 contacts break at "2" time. However, the clutch will remain engaged until "0" (Figure 3), being of the well known one revolution type and the inertia of the motor and associated mechanism is sufficient to assure that the machine completes one cycle each time the clutch and motor energising circuit is completed.

Relay R2 will remain energised until the last card condition is reached, when there is no card at the first sensing station, so that contacts CL1 will be open when contacts T2 open and relay R2 will be de-energised.

Since contacts R2a are now shifted, the feed clutch magnet 19 and the motor M are no longer controlled by the Start key, so that after the initial depression cards cannot be fed by accidental depression of the Start key. Cards are now fed and sensed under control of the conveyor system in order to control the release of bodies in the required order. However, in order to synchronize the operation of the tabulator with the movement of the conveyor, it is necessary to establish the time of arrival of a pair of driving dogs at the storage area. This is accomplished in the following way:

Trolleys leave the bays in the storage area loaded with bodies and are returned empty to be reloaded, switch means being provided to indicate that an empty trolley has arrived back at the storage area. The empty trolley is removed from the pair of dogs on the driving chain and these dogs are then available to pick up a loaded trolley from one of the bays. These arrangements are shown diagrammatically in Fig. 6, which shows the layout of the conveyor in the storage area 7. Empty trolleys return along the right-hand path, being driven by the chain 102, and the main trolley track turns along a path 116 out of the line of the driving chain. Thus, trolleys are turned out of engagement with the pairs of dogs on the chain. Shortly before this disengagement takes place switch 27 is operated by the passage of a trolley in a manner similar to that described for the operation of the switches 44 as a trolley leaves a storage bay on a branch track 117. The distance between the switch 27 and the first bay is less than the distance between two successive pairs of dogs on the driving chain.

Contacts 27a (Fig. 2A) of the switch 27 are connected to the tabulator by wires in a cable 16 (Figure 1). This is indicated in Figure 2A by the broken line connections. If the distance between switch 27 and the tabulator is considerable, the voltage drop in cable 16 may be unduly large and it is then desirable to use a link circuit. In this case the contacts operate a relay located in storage area 7. This relay has a pair of contacts in the link circuit which may then be operated at any convenient voltage. When the contacts of this relay close, a further relay in the link circuit is energised and closes contacts which are wired in the position of contacts 27a in Figure 2A. It will be appreciated that this linking does not alter the operation of the circuit but merely obviates voltage drop in tabulator control circuit due to the length of cable 16.

When contacts 27a (Fig. 2A) of the switch 27 (Fig. 6) close, and a circuit is made from line 41 (Fig. 2A), contacts 27a (shifted), cam contacts T3, contacts R5a, feed synchronizing relay R4 to line 42, contacts T3 being closed since the tabulator stops at the "0" position (Figure 3). Relay R4 closes contacts R4b, so that a relay R5 is now energised by a circuit from line 41, contacts 27a (shifted), synchronizing interlock relay R5, contacts R5b, contacts R4b (shifted), relay R4 to line 42. Relay R5 will shift make before break contacts R5b to establish a hold circuit to line 41 and will also shift contacts R5a to break the energising circuit for relay R4. Relay R5 will remain energised until contacts 27a of switch 27 open as the trolley moves away on track 116 under the influence of gravity, so that contacts R5a will remain shifted to prevent re-energisation of relay R4 if contacts 27a should remain closed for a period greater than that taken by the tabulator to perform one cycle.

When relay R4 is energised contacts R4a close to make a circuit from line 41, contacts R4a (shifted), contacts R2a (shifted), contacts R1b, relay R1, feed clutch magnet 19, drive motor M to line 42. Thus the feed clutch magnet and drive motor are operated as before, to feed a further card to the first sensing station whilst the first card is fed to the second sensing station. Thus first the card is fed and sensed at the second station in synchronism with the conveyor operation. At this second station the required type of body will be determined and this information is stored to cause the release of the appropriate body as the driving dogs approach the selected storage bay.

The second sensing station which is that more remote from the card feed magazine is indicated diagrammatically by a contact roll 25 and associated brushes which are connected to individual plug sockets 23. A plug connection (not shown) is made from the particular socket 23 relating to the card column in which is punched a digit representing the body type to a plug socket 21 which is connected successively through a distributor which is driven by the main tabulator drive shaft to any one of a plurality of counter operating magnets. The counters are of the well-known electromagnetic type, in which a mechanical drive is provided for the counter wheel and the wheel may be clutched to this drive by energisation of the related counter magnet, the extent of rotation of the wheel being determined by the time in the machine cycle at which the magnet is energised.

A card lever contact CL2 will be closed by the first card in moving from the first sensing station to the second sensing station and this will complete a circuit for energising a sensing control relay R3. Contacts R3b will close to provide a hold circuit through cam contacts T2, in parallel with contacts CL2. Relay R3 will be maintained energised by this circuit until after the last card has been sensed at the second sensing station.

In the first card, in the example already considered, the digit 2 is recorded in the field relating to body type. Since there are less than ten types, this field will actually comprise only one column, and the plug connection will be made from the socket 23 corresponding to this column, hence at "2" time in the second cycle there will be a circuit from line 41, circuit breaker contacts CB, contacts R3c (shifted), contact roll 25, the hole in the first card in the "2" position, a sensing brush, a socket 23, a plug connection (not shown), socket 21, distributor common bar and brushes, counter magnet CR2 to line 42. The magnet CR2 will be selected since the distributor is driven by the tabulator and will be on the second segment: from the top, at 2 time. Similarly, the top segment will be operative at "1" time, and the bottom segment at "8" time. The counter magnet CR2 on being energised will operate the related counter wheel and the usual counter contacts CR2a will close.

The tabulator will be arrested at "0" at the end of the second cycle and the counter contact CR2a will remain closed since, following usual practice, it is not reset until after "Y" time. Thus the counter contact will retain registration of the fact that a "2" has been sensed until the next card feed cycle occurs. The counter wheel is thus being used as a storage device having on and off conditions, corresponding to the closed or open state of the counter contacts. Since there are eight counter positions corresponding to the eight bays selectively operated by the distributor any digit from 1 to 8 may be represented by the closed state of the appropriate counter contact. No carry facilities are provided between counter wheels so that each operates as an individual storage device, and not as a value accumulator.

The closing of contacts CR2a is used to control the feeding of a type 2 body on to the body conveyor, but due to the difference in spacing of the conveyor dogs and the delivery bays this control cannot be exercised directly. Associated with each bay is a storage device of the type shown and described in U.S. patent specification 2,275,396, to which reference may be had for further description. Certain simplifications are effected in that only one setting magnet and one contact member are provided for each ring of armatures. The shaft, to which are secured the armature retaining rings, is driven synchronously with the conveyor so that the shaft makes one revolution in the time elapsing between the closing of the contacts 27a by a trolley driven by a dog and the same dog reaching the end of the eighth or last bay. The contact member for each of the storage devices is spaced at a different angular distance from the related setting magnet so that various delays are provided between the setting of an armature by the energisation of a setting magnet and the readout of the setting by the set armature reaching the contact member. The delay of each storage device is equal to the time required for a dog to travel from the position at which contacts 27a were closed to a position opposite the bay corresponding to the storage device.

Figure 2B:
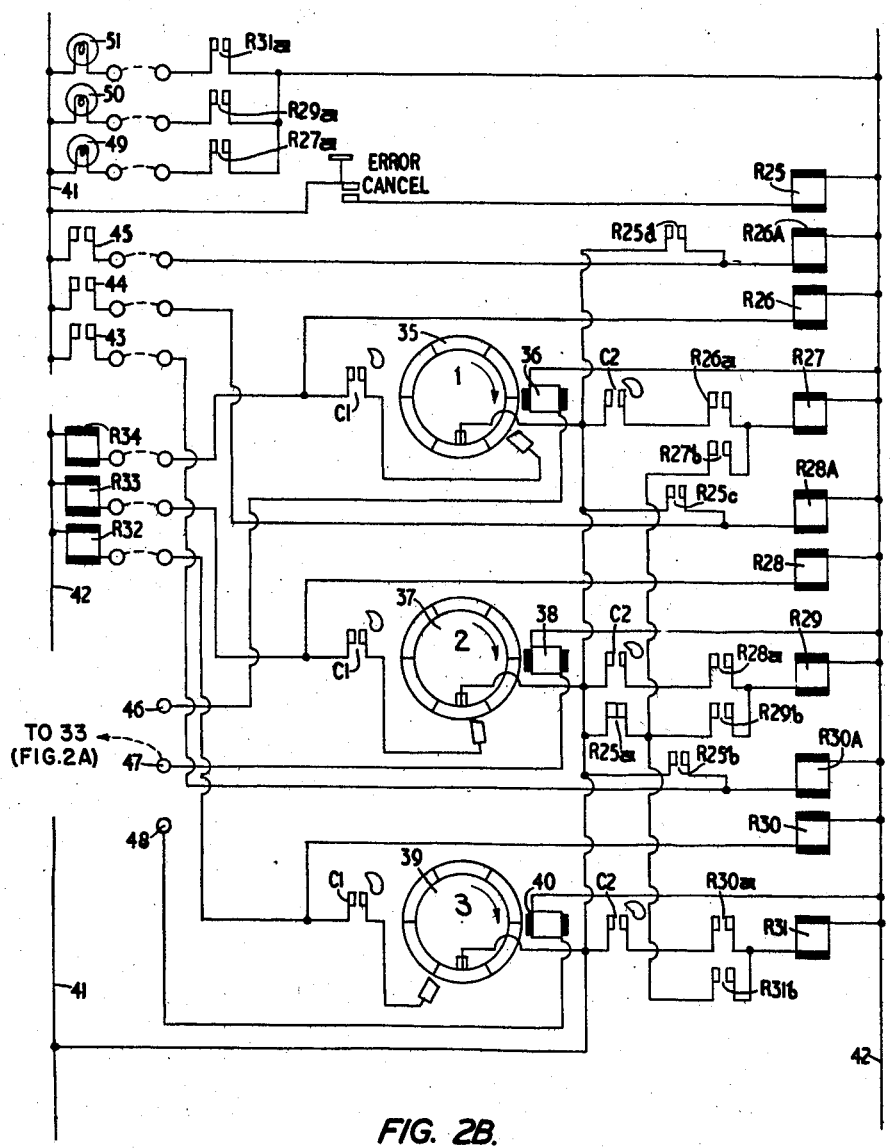

The storage devices for the first three bays are shown schematically in Figure 2B, being referenced 35, 37 and 39 respectively. Thus Fig. 2B shows those parts of the control apparatus which are electrically interconnected with the tabulator circuits shown in Fig. 2A but which are mechanically driven in synchronism with the main conveyor drive. The setting magnets 36, 38 and 40 of the three storage devices are controlled by counter contacts CR1a, CR2a and CR3a in a bank CR1a to CR8a of such contacts (Figure 2A) respectively. It will be appreciated that five similar further storage devices are provided for the other bays and are controlled by contacts CR4a to CR8a.

These storage devices are used to control the release of bodies from each of the bays shown in Fig. 6. The empty trolleys returned to the storage area travel along the track 116 under the influence of gravity and are manually re-loaded and moved into a storage bay along one of the tracks 117, the particular bay being determined by the type of body with which the trolley is loaded. Trolleys are subsequently released, by the operation of bay release magnets R32, R33, R34 and corresponding magnets for the remaining bays. Operation of one of these magnets causes the first trolley in the bay to be released by the retraction of the latch 120 (Fig. 5). The first trolley in the bay then runs under the influence of gravity toward the junction of the track 117 with the main track. Operation of the bay release magnet also causes the movement of the diverter arm 111 into the position shown in Fig. 5 to allow the trolley to pass into the main track 107. Operation of the bay release magnets will now be described.

With contacts CR2a closed in the manner already described, a circuit will be made from line 41 (Figure 2A) cam contacts T5 (closed), counter contacts CR2a (shifted), a plug socket 33, in a bank of plug sockets 28' to 34, a linking connection indicated by a broken line, a plug socket 47 (Figure 2B), setting magnet 38 to line 42. The relative timing of the shaft driving the storage devices and the conveyor is such that an armature of the storage device 37 will be in a position to be set by the energisation of magnet 38.

The contact member for the storage device 37 is set at an angular distance of approximately 82° from the setting magnet 38 in the direction of rotation as indicated by an arrow. The contact member for storage device 35 for the first bay is set approximately 41° ahead of that for the second bay, whilst the contact member for the third bay is approximately 41° beyond that for the second bay. In this way a successively greater delay is provided by the storage devices associated with bays 1, 2 and 3. The contact members of the other storage devices not shown are progressively staggered at 41° intervals in the same way. Thus the contact member of the eighth storage device is approximately 328° from the setting magnet.

When a dog is at the correct position for picking up from the eighth bay, another dog will be at such a distance from switch 27 that the stud 109 (Fig. 5) of an empty trolley driven by this dog will not close the switch contacts until the storage drive shaft has rotated a further 12°. The closure of contacts 27a does not cause energisation of a setting magnet until after a delay equal to the time required for 20° of rotation of the storage drive shaft. Since all the storage devices are synchronised with the conveyor, the relative timing as described ensures that an energised storage magnet will always be able to set a related armature and that the delay introduced in reading out will be such as to ensure delivery of a trolley from a chosen bay at the correct time for pick up by the required driving dog.

When the set armature of the storage device 37 reaches the related contact member a circuit will be made from line 41 (Figure 2B) through storage device 37, cam contacts C1, a link wire, magnet R33 to line 42. Magnet R33 is the bay release magnet for the second bay, and on energisation controls the delivery of a body from this bay to a point at which it is picked up by a dog on the conveyor.

The cams operating contacts C1 are driven from the shaft driving the storage devices. The contacts are closed each time an armature of the related storage device passes the contact member, and they serve to define accurately the duration of the energisation of the bay release magnets when a set armature passes a contact member.

The dog driving the trolley which caused the feeding of the first card to the second sensing station and the consequent energisation of magnet 38 will be passing in front of the second bay at the time when bay release magnet R33 is energised, due to the delay introduced by the card feeding and by the storage device 37. Consequently, the trolley carrying a type 2 body will be released from the second bay, is automatically picked up by this dog and transported to the assembly point 6 (Figure 1).

In order to check that the operation takes place correctly, it is arranged that each time a body is picked up from the second bay, a contact 44 (Figure 6) is closed.

A checking relay R28 of the mechanically latched type is in parallel with magnet R33, so that it is energised when magnet R33 is energised. When contacts 44 close there will be a circuit through coil R28A of relay R28, which will reset the relay since coil R28A is the unlatching coil.

Subsequent to the resetting of relay R28, cam contacts C2 close, but are ineffective to energise a failure-registering relay R29 since contacts R28a in series therewith are open. Cam contacts C2 are operated by the same shaft as contacts C1 and close once for each armature passing a contact member.

If the trolley is not released, then contacts 44 will remain open, so that relay R28 will not be reset. When contacts C2 close there will be an energising circuit for relay R29 and a holding circuit will be made from line 42, relay R29, contacts R29b (shifted), contacts R25a to line 41. Contacts R29a will close to provide a circuit to an error indicating lamp 50. This lamp may be located either in proximity to the bays or at the control tabulator. In either case, warning is given so that action may be taken to deal with the failure to deliver the body. It will be apparent that additional contacts of relay R29 could be wired into the control circuit of a motor driving the conveyor so that the conveyor is halted if an error occurs.

In order to cancel the error indication, an Error Cancel key is depressed to make a circuit for an error resetting relay R25. Contacts R25c close to make a circuit to the unlatching coil R28A to reset relay R28. Contacts R25a open to break the hold circuit for relay R29, so that this relay is de-energised and the circuit returns to normal condition.

The complete sequence of operations for one body has now been described whereby a trolley approaching the bays causes a card to be fed in the tabulator, a counter magnet, and a storage device setting magnet and a bay release magnet to be operated in sequence and a check to be made to ensure that a trolley has been picked up by the conveyor. A similar sequence occurs each time a trolley operates the switch 27 (Fig. 6) to close contacts 27a (Fig. 2A). The control circuits for the first three bays are shown in detail, checking relays R26, R28 and R30 correspond in the three bays for example. Similarly, relays R27, R29 and R31 are operative to indicate errors in each of the three bays. The remaining five bays each have a control circuit similar to that shown for each of the first three bays.

An exactly similar arrangement of a tabulator and associated control circuits is provided to control the feeding of the various types of engines from the storage area 3 (Figure 1) on to the conveyor 10. This tabulator is also located at the control station 4 and is linked to the storage area 3 by cable 15.

Since no selection of axles or chassis is required, only one counter magnet and storage device is needed with the related tabulator. That is, the circuit is similar to that controlling the first bay in the body storage area. Cables 13 and 14 link the control tabulators for axles and chassis with their respective storage areas. The feeding of two axles for each card fed may be arranged conveniently by mounting each pair of axles on a suitable frame, so that they may be dealt with as a single unit.

At the beginning of the day, the duplicate packs of cards are placed in the feed magazines of the tabulators and the conveyors are started up in sequence. If assembly is to begin at 7 a.m. for example, then the axle conveyor 8 will be started first at 6.33 a.m. followed by the starting of conveyors 10, 9 and 3 at 6.39 a.m., 6.42 a.m. and 6.57 a.m. respectively. It will be apparent that with this timing the sub-assemblies for the first card will all arrive at the assembly point 6 at 7 a.m.

It may be noted that since the conveyors are started at different times, different cards may be fed in the various control tabulators at the same instant of time. Thus the axle control tabulator may be feeding the sixth card when the body control tabulator is feeding the first card. However, due to the delay between feeding a sub-assembly to a conveyor and arrival at the assembly point, and the fact that all the control packs are identical, the correct groupings of sub-assemblies will always be delivered to the assembly point.

It is desirable to make provision for speeding up delivery of sub-assemblies by one or more of the conveyors, so that any time loss by power supply failure, breakdowns, etc., may be regained. For this purpose, cards punched with the digit "0" in all fields are inserted in the control packs. If one of these cards is inserted after every five control cards, for example, then one driving dog in every six on each of the conveyors will not have a trolley fed to it, since sensing of a "0" punching will not cause energisation of any of the bay release magnets.

In order to speed up delivery, when required, switches are provided to enable one, two, three or four cards punched with "0" to be fed through the tabulator sensing stations without holding up the feeding of the normal control cards. Considering the body control tabulator again, a counter magnet CR0 (Figure 2A) may be made operative by inserting a plug connection when a "0" punched card is sensed at the first sensing station. A circuit is made at "0" time in the machine cycle from line 41, contacts CB, contacts R2c (shifted), contact roll 24, a brush sensing "0" in the card column relating to body type, a plug socket 22, a plug connection (not shown), a plug socket 20a, a timing commutator T9 made at "0" time (Figures 2A and 3), counter magnet CR0 to line 42. Energisation of the counter magnet will cause counter contacts 20 to close.

Four cancel control switches SW1, SW2, SW3 and SW4 are provided to select whether 1, 2, 3 or 4 cards punched with a "0" should be made ineffective. It will be assumed that three cards are to be made ineffective so that switch SW3 will have been placed in the "on" position, and a "Cancel" key depressed to energise a zero-card cancel control relay R14 through the closed key contacts and switch SW3. Contacts R14a, R14b and R14c will have closed to energise three further cancel cycle control relays R21, R22 and R23 respectively. These three relays are of the mechanically latched type so that the contacts will remain in the operated position until the corresponding reset coil is energised. When the next 0-punched card arrives at the first sensing station a two-card feed control circuit consisting of relays R10 and R11 is set up to allow the 0-punched card to be fed straight through the second station followed by the next body-selection card. Thus, the ineffective card cycle which would normally occur due to the passage of the 0-punched card through the second sensing station does not take place since the following card is sensed immediately afterwards. The operation of the two-card feed control circuit is as follows:

With relay R21 energised a circuit is made from line 41, "0" counter contacts 20 (shifted), contacts R10b, contact R21c (shifted), relay R10 to line 42. Relay R10 shifts make before break contacts R10b to establish a hold circuit through cam contacts T8 (Figures 2A and 3).

The machine will now have stopped with a "0" punched card about to enter the second sensing station and this card will be fed through this station the next time contacts 27a close, in the manner already explained. During this subsequent cycle a relay R11 will be energised when cam contacts T7 close (Figure 3), by a circuit from line 41, cam contacts T8, contacts R10b (shifted), contacts R21c (shifted), cam contacts T7, relay R11 to line 42. Relay R11 is of the latched type so that contacts R11b will remain closed and a parallel circuit across cam contacts T1 in the motor circuit will be provided through contacts R11b (shifted) and contacts R21b, R22b and R23b (all shifted) in parallel. Cam contacts T8 open at "5" time in the cycle to de-energise relay R10, thus breaking the set up circuit for relay R11 and the counter contacts 20 are reset prior to "9" time as for the other counter contacts, so that relay R11 cannot be re-energised until contacts 20 are closed again.

Since cam contacts T1 are shunted by contacts R11b, R21b etc., the motor circuit is not de-energised at "2" time and in consequence a second card feed cycle occurs to feed the card following the "0" punched card through the second sensing station. Assuming that this following card is a normal control card, then it will cause selection of a body in the manner already explained. During this cycle, cam contacts T6 will close at "E" (Figure 3) to energise a reset coil R11a (Figure 2A) to unlatch relay R11. This opens contacts R11b, breaking the shunt circuit across cam contacts T1, so that the motor will be de-energised at the end of this second cycle. This two-card feed control circuit is effective for as many 0-punched cards as are required under the control of cancel-cycle control relays R21 to R24 and their auxiliary cycle relays R6 to R9, which are controlled in turn by the zero-card cancel control relays R13 to R15 and the cancel control switches SW1 to SW4. These cycle control arrangements are described in relation to the example chosen as follows:

When relay R11 was energised contacts R11a also closed and a circuit was made when cam contacts T4 closed from line 41, contacts R11a (shifted), cam contacts T4, contacts R24a, contacts R23a (shifted), a relay R7 to line 42. Relay R7 then closes contacts R7b to complete a circuit to reset coil R23A of relay R23, but coil R23A is not energised until contacts T4 open, since they act as a shunt across the coil. When coil R23A is energised relay R23 is reset, since with the "Cancel" key now released relay R14 is not energised and the set up circuit for relay R23 is inoperative.

When the next "0" punched card is sensed at the first sensing station, contacts 20 will again close and set up relays R10 and R11 to provide another double feed cycle. The circuit through contacts R11a will energise a relay R8 to effect resetting of relay R22 in the same way as relay R7 reset relay R23.

When the third "0" punched card is sensed a third double feed cycle will ensue and a relay R9 will be energised to reset relay R21, so that all the cancel circuit relays are returned to the normal position and no more double feed cycles will occur on "0" punched cards being sensed until the "Cancel" key is again depressed.

If switches SW1, SW2, or SW4 are put in the "on" position, then the circuit will function as already described, except that the number of relays set up will vary. For a one card cancellation relay R21 only is operated for a two card cancellation relays R21 and R22 are operated and for a four card cancellation relays R21, R22, R23 and R24 are operated.

It has been assumed that the "0" punched cards were interleaved singly with the control cards, but it will be apparent that if three such cards occur together for example and switch SW3 is "on," then four successive feed cycles will take place to feed the three cards and the following control card through the tabulator for one closure of contacts 27.

As a further check on correct operation of the control circuit, contacts R2d and R3d are connected, in series with an error indicator lamp 26 (Figure 2A), between the supply lines 41 and 42. If cards fail to feed from the card magazine, the card lever contacts CL1 and CL2 will open to de-energise relays R2 and R3. Contacts R2d and R3d will then be closed and the error lamp 26 will light to indicate that cards are not being fed.

So far, attention has been directed primarily to the automatic selection and feeding of the various sub-assemblies. In the case of the store for minor items, selection of bins containing the required items is effected manually, so that certain modifications of the fully automatic arrangements are necessary.

It will be assumed that three different groups of minor items are held in the stores and that group 1 is used for body types 1, 3, 5 and 7. Group 2 is used for body types 2 and 4 and group 3 is used for body types 6 and 8. Accordingly, the first card will have the digit "2" punched in a column allocated to the stores control number, whilst the second card will be punched with the digit "1" in the same column.

The stores control tabulator functions in exactly the same manner as the body control tabulator already described and senses a similar pack of control cards. Since there are only three alternative groups of items, only three counter positions are necessary. Each counter contact is used to control operation of a card feeding and ejecting unit instead of a storage device as with the other tabulators. The construction of these units may conveniently be similar to that shown incorporated in a record card punch in U.S. patent specification 2,343,414, to which reference may be had for a detailed description. The circuits controlling the feeding and ejection are modified from that shown in the patent in order to operate in conjunction with the tabulator.

A separate pack of cards is placed in the card magazine of each of the three units. The cards of each pack may be differentiated by being of different colours, or may have some identification such as the group number printed thereon.

Figure 4:
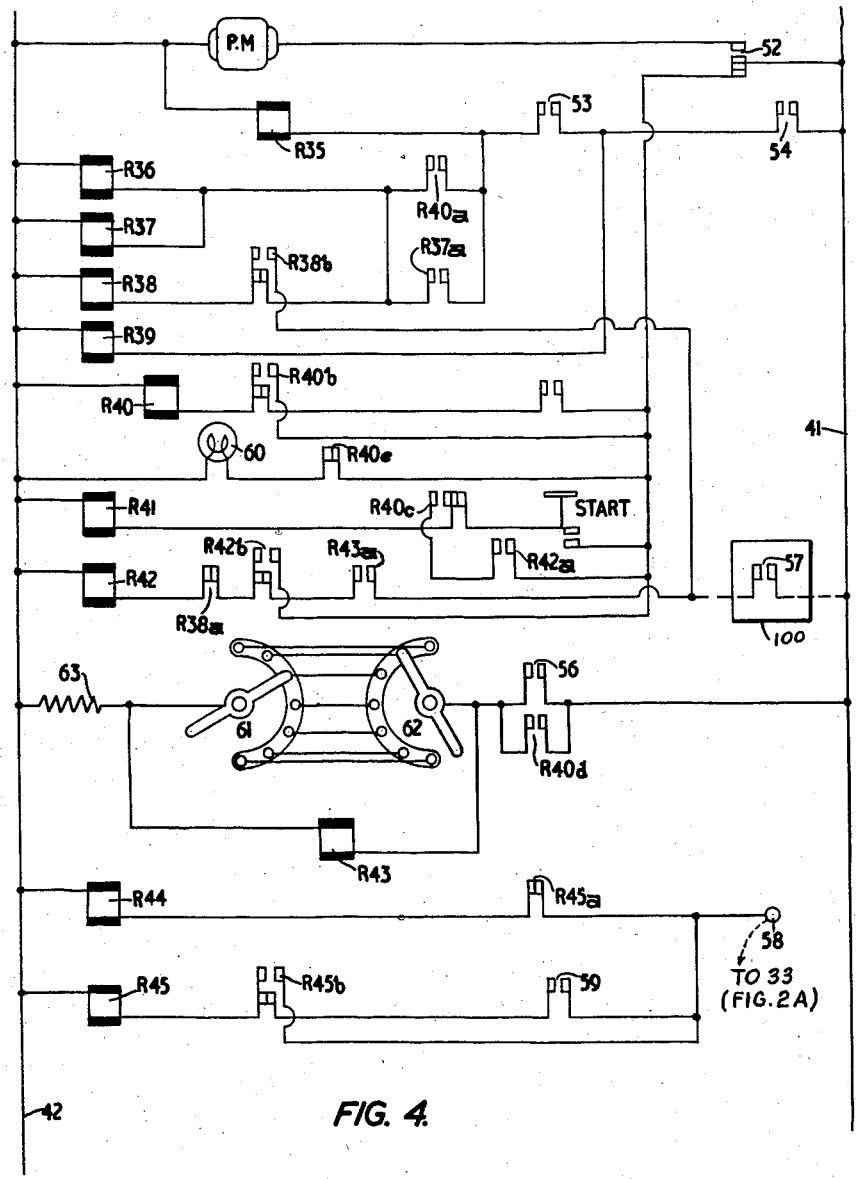
Figure 4 is a diagram of the control circuits of a card feeding and ejecting unit.

The construction and operation of each of the units is the same, so that only that relating to group 2 will be described in detail. The circuit for this unit is shown in Fig. 4.

In order to bring the unit into operation, a "Start" key (Figure 4) is depressed. A circuit is thus made from line 41, contacts 52, "Start" key contacts (shifted), contacts R40c, a release magnet R41 to line 42. Magnet R41, when energised, effects release of the card carriage, so that it moves to the last column position. Contacts 52 are the usual latch contacts which are shifted by energisation of a trip magnet R35 and are reset by the card carriage driving mechanism when the carriage has been returned fully to the first column position.

With the carriage in the last column position, last column contacts 54 close to complete a circuit to a card ejector magnet R39. Energisation of magnet R39 causes operation of the card ejector jaws, which operation is ineffective at this time since there is no card in the carriage. Movement of the card ejector jaws, however, closes contacts 53 to complete a circuit to trip magnet R35. This magnet shifts latch contacts 52 to complete a circuit to a drive motor PM which operates to move the card carriage to the first column position to feed a card from the magazine to the carriage and to reset contacts 52, as explained in more detail in U.S. patent specification 2,343,414.

A card lever contact 55 is closed when a card is in the carriage, so that a relay R40 is now energised by a circuit from line 41, contacts 52, contacts 55 (shifted), contacts R40b, relay R40 to line 42. Relay R40 establishes a hold circuit through shifted make before break contacts R40b. The unit will now remain with the carriage in this position and relay R40 energised until an impulse is received from the stores control tabulator. The relay R40 is thus a supervisory relay to indicate that the unit is ready for use.

A connection is made between a plug socket 58 (Figure 4) and the plug socket connected to the second counter magnet contact of the stores tabulator, corresponding to socket 33 of the body control tabulator (Figure 2A). This connection which is incorporated in cable 18 (Fig. 1) is shown by means of dotted lines in Figs. 2A and 4 by way of example but it will be appreciated that since two separate tabulators are used for stores and body control respectively, the two connections shown at socket 33 of Fig. 2A are not, in practice, made on the same tabulator. With this counter contact closed as a result of sensing the first card, there will be a circuit just after "1" time in the tabulator cycle when contacts T5 close to energise a magnet R44 (Figure 4) which is the wiper operating magnet of a stepping switch or uniselector 61 of known form. Each energisation of magnet R44 causes the wiper to move around one contact position.

Each contact of uniselector 61 is connected to the corresponding contact position of a second uniselector 62 and a demand relay R43 is connected between the two wipers. When the two wipers are in corresponding positions relay R43 will be shorted out, but as long as the wipers are out of step, then R43 may be energised. Accordingly, when the wiper of uniselector 61 has moved, relay R43 will be energised by a circuit from line 41, contacts 56 and R40d (both shifted) in parallel, relay R43, a resistor 63 to line 42. Contacts 56 are the usual magazine contacts which are closed as long as cards are in the magazine. Thus the operation of relay R43 indicates that a card has been demanded by the stores control tabulator.

The stores conveyor 11 (Figure 1) is of the continuous belt type and at points on the conveyor where store bins are to be placed are mounted projecting lugs. These lugs serve to close contacts 57 (Figure 4) of switch assembly 100 mounted adjacent the conveyor and placed ahead of the loading point, as in the case of contacts 27a. The contacts 57 are connected to the unit by means of a cable as shown by broken lines in Fig. 4. When contacts 57 are closed and relay R43 is energised, a circuit is made from line 41, contacts 57 (shifted), contacts 43a (shifted), make before break contacts R42b, contacts R38a, a card ejection control relay R42 to line 42. Contacts R42b shift to provide a hold circuit for relay R42 via contacts 52.

Contacts R42a close to make a circuit to the release magnet R41 through contacts R40c (shifted). Energisation of the release magnet will cause the carriage to move to the last column position, with consequent ejection of the card therein, and automatic return of the carriage to pick up the second card.

It is convenient to locate the card feed and ejection units adjacent to the conveyor, so that the ejected card falls on to the conveyor belt instead of into a card stacker. The ejected cards are carried on the conveyor past the loading point and thus provide a visual indication of the items to be selected and placed on the conveyor. Thus in the case of the stores control, the control tabulator is located in the control area 4 (Fig. 1) and the card ejecting units are located in the stores area 5 so that instead of the selection of a particular type of assembly as in the case of the body storage bays previously described, the operation of the tabulator results in the selection of an appropriate one of the card feeding and ejecting units to deliver a card to the conveyor.

The counter contacts may still be closed after the completion of this cycle and a single step control relay R45 is provided to prevent a second energisation of relay R44 due to this cause. When uniselector 61 is operated it closes a contact 59 to energise relay R45. This relay establishes a hold circuit through make before break contacts R45b which is maintained until the counter contacts open and also opens contacts R45a to break the energising circuit for relay R44.

When eject contacts 53 close to energise trip magnet R35, parallel circuits are made through contacts R40a (shifted) to energise a relay R37 and a magnet R36 which is the operating magnet for uniselector 62. Relay R37 closes contacts R37a to provide a shunt across contacts R40a. Energisation of magnet R36 causes the wiper of uniselector to move on to the next contact position, so that the wipers of the two uniselectors are now on corresponding contact positions and relay R43 will remain shorted out, until another card punched with a "2" is sensed. Thus the uniselector 62 is moved so that its wipers coincide with the position of the wipers of uniselector 61 only after the card which was demanded by the control tabulator has actually been delivered to the conveyor, and the demand relay R43 will therefore remain operated until the required card has been delivered under control of the contacts 57.

The selection of the correct group of store items is governed by the type of body with which they are to be used. The times required for feeding from store area 5 (Figure 1) and body storage area 7 to the assembly point 6 are six minutes and three minutes respectively. For this reason a pre-indication is required at the stores area, that is an indication is required of the type of body which will be fed on to conveyor 12 three minutes after the indication has been given. To effect this, the contacts corresponding to contacts 27a (Figure 2A) which control the feeding of cards in the stores control tabulator is placed on the return side of conveyor 12 (Figure 1) at such a distance from contacts 27a for the body tabulator that these first contacts are closed by a particular trolley three minutes before the same trolley closes contacts 27a. These contacts are connected to the stores tabulator by a cable 17. The two conveyors 11 and 12 are started at the same time and the pack of control cards is placed in the card magazine of the stores control tabulator, but the corresponding pack is not placed in the card magazine of the body control tabulator until three minutes later, thus ensuring that the required relation is maintained between the feeding of the two packs.

Provision is made at assembly point 6 for holding a number of body sub-assemblies in reserve. In order to accumulate such a reserve, conveyor 12 may temporarily be run at a higher speed than the other conveyors. This will result in cards being fed in the stores control tabulator at a correspondingly increased rate, without a corresponding increase of speed in ejection of cards which is governed by the speed of conveyor 11. The two uniselectors 61 and 62 then act together to provide temporary storage of the control information. The wiper of uniselector 61 may become several contact positions ahead of that of uniselector 62. Under these conditions, successive card feeding and ejection will occur by the circuit operating in the manner described until relay R43 is once again short circuited independently of the cards being fed in the stores tabulator at that time.

To prevent relay R42 being operated more than once for each closure of contacts 57, a single card interlock relay R38 is operated when contacts 53 close by a circuit from line 41, contacts 54 (shifted), contacts 53 (shifted), contacts R40e (shifted), contacts R38b, relay R38 to line 42. Relay R38 then establishes a hold circuit through make before break contacts R38b and contacts 57. Contacts R38a open to break the energising circuit for relay R42, so that further operation of relay R42 is prevented whilst contacts 57 are closed and maintain relay R38 energised.

If a card fails to feed into the carriage of the unit, relay R40 will not be energised. When latch contacts 52 are reset at the end of the return movement of the carriage there will be one circuit to an indicator lamp 60, through contacts R40e which will light to indicate the failure.

For convenience this invention has been described using record cards but it will be understood by those skilled in the art that record tapes bearing data are exactly equivalent and that therefore all references to record cards herein are to be deemed to include record tapes, and a record card to include a portion of a record tape.

What I claim is:

1. In an item conveying system for assembling items on a conveyor for delivery of said items from a storage area to an assembly area in a sequential order determined by data bearing records, the combination of conveyor means moving between said item storage area and said assembly area, a plurality of item carrying means mounted at spaced points along said conveyor, a plurality of individual item storage bays forming said storage area, spaced apart along said conveyor and adjacent thereto, an item release means for each of said bays effective when operated to release an item from the associated bay for engagement with one of said item carrying means, a mechanically operated switch means adapted when operated to pass an electrical signal and mounted adjacent to the conveyor and operated by the passage of each item carrying means, a plurality of data bearing records, record sensing means for sensing said records connected in circuit with said release means, means controlled by the signal from said switch means for rendering said sensing means operative to sense successive records on successive operations of said switch means, means controlled by said sensing means for operating selectively said release means in accordance with the data sensed, and delay means also controlled by said sensing means for delaying the operation of said operating means by different periods determined by the sensed data.

2. In an item conveying system for assembling items on a conveyor for delivery of said items from a storage area to an assembly area in a sequential order determined by data bearing records, the combination of conveyor means moving between said item storage area and said assembly area, a plurality of item carrying means mounted at spaced points along said conveyor, a plurality of individual item storage bays forming said storage area, spaced apart along said conveyor and adjacent thereto, an item release means for each of said bays effective when operated to release an item from the associated bay for engagement with one of said item carrying means, a mechanically operated switch means adapted when operated to pass an electrical signal and mounted adjacent to the conveyor and operated by the passage of each item carrying means, a plurality of data bearing records, record sensing means for sensing said records connected in circuit with said release means, a plurality of delay means, each providing a different delay period, means controlled by the signal from said switch means for rendering said sensing means operative to sense successive records on successive operations of said switch means, means operated by said sensing means for applying an electrical signal to one of said delay means selected in accordance with the data sensed, and means for operating selectively said release means by the delayed signal from said selected delay means.

3. In an item conveying system for assembling items on a conveyor for delivery of said items from a storage area to an assembly area in a sequential order determined by data bearing records, the combination of conveyor means moving between said item storage area and said assembly area, a plurality of item carrying means mounted at spaced points along said conveyor, a plurality of individual item storage bays forming said storage area, spaced apart along said conveyor and adjacent thereto, an item release means for each of said bays effective when operated to release an item from the associated bay for engagement with one of said item carrying means, a mechanically operated switch means adapted when operated to pass an electrical signal and mounted adjacent to the conveyor and operated by the passage of each item carrying means, a plurality of data bearing records, record sensing means for sensing said records connected in circuit with said release means, means controlled by the signal from said switch means for rendering said sensing means operative to sense successive records on successive operations of said switch means, separate delay means for each of said release means providing a different delay for each said item storage means, means controlled by said sensing means for selecting one of said delay means in agreement with the data sensed, and means for applying an operating signal to said selected delay means, whereby said release means is operated after a delay.

4. The combination according to claim 3 in which each of said delay means comprises a drum, members arranged around the periphery of said drum and settable in operative and inoperative positions, magnetic means for moving a settable member from said inoperative position to said operative position, means controlled by said sensing means for energising said magnetic means, and second switch means operated by said member when in operative position and effective when so operated to actuate the associated release means.

5. In an item conveying system for assembling items on a conveyor for delivery of said items from a storage area to an assembly area in a sequential order determined by data bearing records, the combination of conveyor means moving between said item storage area and said assembly area, a plurality of item carrying means mounted at spaced points along said conveyor, a plurality of individual item storage bays forming said storage area, spaced apart along said conveyor and adjacent thereto, an item release means for each of said bays effective when operated to release an item from the associated bay for engagement with one of said item carrying means, a mechanically operated switch means adapted when operated to pass an electrical signal and mounted adjacent to the conveyor and operated by the passage of each item carrying means, a plurality of data bearing records each bearing a first data item representing a selected one of said item storage means and at least one additional data item, record sensing means for sensing said records connected in circuit with said release means, means controlled by the signal from said switch means for rendering said sensing means operative to sense successive records on successive operations of said switch means, separate delay means for each of said release means providing a different delay for each said item storage means, selector means controlled by said sensing means for selecting the said delay means corresponding to said first data item sensed from said record, means for applying an operating signal through said selected delay means to the associated release means to cause release of an item from the selected item storage means after a time delay, settable control means operated by said sensing means on the sensing of said additional data item, and means operated by said control means for initiating a further operation of said record sensing means to sense a succeeding one of said record means independently of the operation of said switch means.

6. The combination according to claim 5 in which said control means is settable to a plurality of settings in each of which it is operative for a different number of successive records corresponding to said additional data item.

7. In an item conveying system for assembling items on a conveyor for delivery of said items from a storage area to an assembly area in a sequential order determined by data bearing records, the combination of conveyor means moving between said item storage area and said assembly area, a plurality of item carrying means mounted at spaced points along said conveyor, a plurality of individual item storage bays forming said storage area, spaced apart along said conveyor and adjacent thereto, an item release means for each of said bays effective when operated to release an item from the associated bay for engagement with one of said item carrying means, a mechanically operated switch means adapted when operated to pass an electrical signal and mounted adjacent to the conveyor and operated by the passage of each item carrying means, a plurality of data bearing records each bearing a first data item representing a selected one of said item storage means and at least one additional data item, first and second sensing means for successively sensing said records connected in circuit with said release means, means controlled by the signal from said switch means for rendering said first and second sensing means operative to sense successive records on successive operations of said switch means, settable control means operated by said first sensing means on the sensing of said additional data item, means operated by said control means for initiating a further operation of said record sensing means independently of the operation of said switch means, separate delay means for each of said release means providing a different delay for each said item storage means, selector means connected to said second sensing means for selecting the said delay means corresponding to said first data item sensed from said record, and means for applying an operating signal through said selected delay means to the associated release means to cause release of an item from the item storage means after a time delay.

8. In an item conveying system, a first and second conveyor means movable along fixed paths for delivering items from a storage area to an assembly area, a plurality of card feed and ejector means adjacent the path of said second conveyor means, a plurality of item carrying means mounted at spaced points along said conveyor means, switch means operable by the passage of each carrying means on the first conveyor means in timed relation to the movement thereof, a plurality of data bearing record means, record sensing means operative in response to successive operations of said switch means to sense successive ones of said record means and to generate data-indicating signals, means responsive to said signals selectively to control operation of said card feed and ejector means to feed cards, in a sequence determined by the data on said record means, on to said second conveyor means.

9. In an item conveying system, a first and second conveyor means movable along fixed paths for delivering items from a storage area to an assembly area, a plurality of card feed and ejector means adjacent the path of said second conveyor means, a plurality of item carrying means mounted at spaced points along said conveyor means, switch means operable by the passage of each one of said carrying means on said first conveyor means, a plurality of data bearing record means, record sensing means operative in response to successive operations of said switch means to sense successive ones of said record means and to generate data-indicating signals, signal storage means operative to store signals from said sensing means, further switch means operable by the passage of each one of said carrying means on said second conveyor means in timed relation to the movement thereof, read-out means operable to read-out signals from said storage means in response to operations of said further switch means and means responsive to the signals read-out to control selective operation of said card feeding and ejector means, in a sequence determined by the data on said record card, to feed cards on to said second conveyor means.

10. In an item conveying system for assembling items on a conveyor for delivery of said items from a storage area to an assembly area in a sequential order determined by data bearing records, the combination of conveyor means moving between said item storage area and said assembly area, a plurality of item carrying means mounted at spaced points along said conveyor, a plurality of individual item storage bays forming said storage area, spaced apart along said conveyor and adjacent thereto, an item release means for each of said bays effective when operated to release an item from the associated bay for engagement with one of said item carrying means, a mechanically operated switch means adapted when operated to pass an electrical signal and mounted adjacent to the conveyor and operated by the passage of each item carrying means, a plurality of records each bearing a data item representing one of said locations, a sensing station for sensing said records connected in circuit with said release means, feed means for feeding said records in succession through said sensing station, means controlled by the signal from said switch means for rendering operative said feed means and said sensing station for the sensing of a single record each time said switch means is operated, separate delay means for each of said release means for providing a delay appropriate to the position of the corresponding location in relation to said conveyor, selector means controlled by said sensing station for selecting a delay means corresponding to the data item sensed, and means for energising through said selected delay means the corresponding release means.

11. In an item conveying system for assembling items on a conveyor for delivery of said items from a storage area to an assembly area in a sequential order determined by data recorded on a group of record cards, the combination of a conveyor moving between said item storage area and said assembly area, a plurality of item carrying means mounted at spaced points along said conveyor, a plurality of individual item storage bays forming said storage area, spaced apart along said conveyor and adjacent thereto, a mechanically operated switch means adapted when operated to pass an electrical signal and mounted adjacent to the conveyor and operated by the passage of each item carrying means, feeding and sensing means for said record cards remotely located with respect to said conveyor and including a card hopper holding a plurality of record cards and means for feeding said record cards in succession past the sensing means, said feeding and sensing means being rendered operative to feed and sense a single record card in response to the signal from said switch means, an item release means for each of said bays effective when operated to release an item from the associated bay for engagement with one of said item carrying means, control circuit means, means controlled by the card sensing means operative to activate said control circuit means for operation in accordance with the sensed data, and means effective to operate each of said item release means under the control of said control circuit means whereby each item release means is operated to release an item to that item carrying means which operated said switch means.

12. In an item conveying system for assembling items on a conveyor for delivery of said items from a storage area to an assembly area in a sequential order determined by data recorded on a group of record cards, the combination of a conveyor moving between said item storage area and said assembly area, a plurality of item carrying means mounted at spaced points along the conveyor, a plurality of individual item storage bays forming said storage area, spaced apart along the conveyor and adjacent thereto, a mechanically operated switch adapted when operated to pass an electrical signal mounted adjacent to the conveyor and operated by the passage of each item carrying means, feeding and sensing means for said record cards rendered operative to feed and sense a record card by the signal from said switch, a plurality of time delay units, one for each of said bays, means controlled by the card sensing means operative to select a particular one of the delay units for operation in accordance with the sensed data, an item release means for each bay effective when operated to release an item from the associated bay for engagement with one of said item carrying means, and means effective to operate each item release means under control of one of the delay units, when such delay unit is operated, the time delay provided by each delay unit being such that each item release means is operated to release an item to that item carrying means which operated said switch to initiate the cycle of operation in which that item release means was selected for operation.

13. In an item conveying system as claimed in claim 12 switch means associated with each bay and switchable by an item released from that bay so as to check acceptance of released items, and adapted to reset the control circuit which effected the particular release when so switched.

References Cited in the file of this patent

UNITED STATES PATENTS

| | | |
|---|---|---|
| 1,602,753 | Davis | Oct. 12, 1926 |
| 1,921,109 | Webb et al. | Aug. 8, 1933 |
| 2,120,378 | Tauschek | June 14, 1938 |
| 2,172,756 | Maschmeyer | Sept. 12, 1939 |
| 2,174,699 | Keen | Oct. 3, 1939 |
| 2,275,396 | Johnson | Mar. 3, 1942 |
| 2,315,659 | Russell | Apr. 6, 1943 |
| 2,328,317 | Wentworth | Aug. 31, 1943 |
| 2,362,079 | McCann et al. | Nov. 7, 1944 |
| 2,374,537 | Goldsmith | Apr. 24, 1945 |
| 2,611,074 | Pascoe et al. | Sept. 16, 1952 |
| 2,630,523 | Codman et al. | Mar. 3, 1953 |
| 2,665,775 | Smith | Jan. 12, 1954 |
| 2,684,719 | Johnson et al. | July 27, 1954 |